US012341572B2

(12) United States Patent
Hong

(10) Patent No.: US 12,341,572 B2
(45) Date of Patent: Jun. 24, 2025

(54) FASTENING ASSEMBLY AND RFID TAG

(71) Applicant: YOKE INDUSTRIAL CORP., Taichung (TW)

(72) Inventor: Rong-Der Hong, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 133 days.

(21) Appl. No.: 18/479,110

(22) Filed: Oct. 2, 2023

(65) Prior Publication Data

US 2025/0030458 A1    Jan. 23, 2025

(30) Foreign Application Priority Data

Jul. 20, 2023 (TW) .................................. 112127085

(51) Int. Cl.
*H04B 5/77* (2024.01)
(52) U.S. Cl.
CPC ...................... *H04B 5/77* (2024.01)
(58) Field of Classification Search
CPC ........... G06K 19/041; G06K 19/06037; G06K 19/0723; G06K 19/07758; G06Q 10/087; G06Q 50/265; H04B 5/77
See application file for complete search history.

(56) References Cited

U.S. PATENT DOCUMENTS

| | | | |
|---|---|---|---|
| 2012/0139707 A1* | 6/2012 | Stewart | G06K 19/041 340/10.1 |
| 2013/0090603 A1* | 4/2013 | Hoyle, Jr. | A61M 5/3158 604/189 |
| 2020/0184291 A1* | 6/2020 | Tisdel | G06K 19/07758 |

FOREIGN PATENT DOCUMENTS

CN          209436512 U    *  9/2019

* cited by examiner

*Primary Examiner* — Omer S Khan
(74) *Attorney, Agent, or Firm* — Apex Juris, pllc; Cera Oh

(57) ABSTRACT

A fastening assembly includes an RFID tag and a tie including a head member and a strap member. The strap member provided with engaging teeth. The RFID tag includes a body and an RFID device embedded in the body. The body has a first side and a second side opposite to each other. The body has a through hole penetrating through the first side and the second side. An end of the strap member passes through the through hole. The body is movable in a first direction and a second direction opposite to the first direction along a longitudinal direction of the strap member to change a position of the body in the longitudinal direction of the strap member. The end of the strap member passes through the lock hole so that the strap member forms a closed loop. The RFID tag is located on the closed loop.

23 Claims, 22 Drawing Sheets

FASTENING ASSEMBLY AND RFID TAG

BACKGROUND OF THE INVENTION

Technical Field

The present invention relates generally to an electronic tag, and more particularly to a fastening assembly and an RFID tag.

Description of Related Art

There are ties with an RFID tag. For example, the tie disclosed in the UK Patent Publication No. GB2477927A includes a strap member and a head section, wherein a housing is provided outside the head section and an RFID (Radio Frequency Identification) device is disposed inside the housing. When the tie with the RFID tag is in use, the strap member is wound around an object to be fastened and is subsequently inserted into the head section to form a loop, such that the head section and the strap member are fastened around the object.

Although the above-mentioned tie with the RFID tag can fasten the housing and the RFID device inside the housing to the head section, in the process of tightening the strap member, it is necessary to adjust a position of the entire tie as needed for locating the RFID device at a predetermined position suitable for being sensed by a reader. However, after tightening the strap member, the head section moves in the direction of applied force, causing the RFID device to deviate from the predetermined position and increasing difficulties for the reader to sense.

Therefore, the conventional tie with the RFID tag still has room for improvement.

BRIEF SUMMARY OF THE INVENTION

In view of the above, the objective of the present invention is to provide a fastening assembly and an RFID tag, wherein a position of the RFID tag on the strap member could be adjusted.

The present invention provides a fastening assembly, including a tie and an RFID tag. The tie includes a head member and a strap member. The head member has a lock hole. An inside of the lock hole is provided with at least one pawl. The strap member is elongated, wherein an end of the strap member is connected to the head member. The strap member has a surface. A plurality of engaging teeth is provided on the surface of the strap member and is arranged along a longitudinal direction of the strap member. The RFID tag includes an RFID device and a body, wherein the RFID device is embedded in the body. The body has a perimeter wall having a first side and a second side opposite to the first side. The body has a through hole penetrating through the first side and the second side. Another end of the strap member passes through the through hole. The body is movable in a first direction and a second direction opposite to the first direction along a longitudinal direction of the strap member to change a position of the body along the longitudinal direction of the strap member. The another end of the strap member is configured to pass through the lock hole, so that the at least one pawl abuts against one of the plurality of engaging teeth. A portion of the strap member forms a closed loop. The body of the RFID tag is located on the closed loop.

The present invention further provides an RFID tag configured to be cooperatively used with a tie. The tie has a strap member having a surface. A plurality of engaging teeth is provided on the surface of the strap member and is arranged along a longitudinal direction of the strap member. The RFID tag is movable in a first direction and a second direction opposite to the first direction along the longitudinal direction of the strap member. The RFID tag includes a body and an RFID device. The body has a perimeter wall having a first side and a second side opposite to the first side. The body has a through hole penetrating through the first side and the second side. The through hole is configured to be passes through by the strap member. The body is movable in the first direction and the second direction along the longitudinal direction of the strap member. The RFID device is embedded in the body.

With the aforementioned design, by moving the body of the RFID tag on the strap member, the purpose of adjusting the position of the RFID tag on the strap member of the strap could be achieved.

BRIEF DESCRIPTION OF THE SEVERAL VIEWS OF THE DRAWINGS

The present invention will be best understood by referring to the following detailed description of some illustrative embodiments in conjunction with the accompanying drawings, wherein.

DETAILED DESCRIPTION OF THE INVENTION

Figure 1:
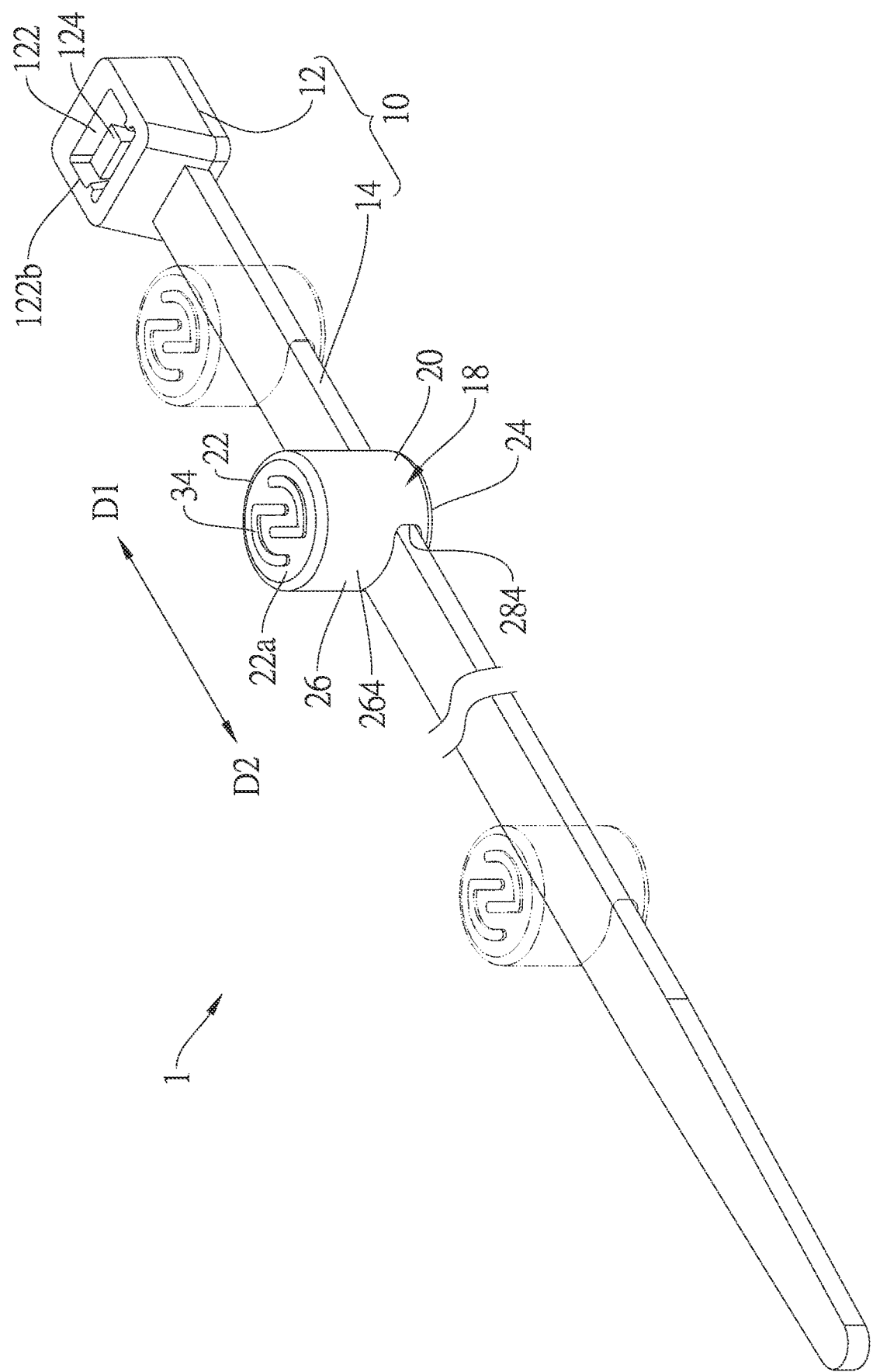
FIG. 1 is a perspective view of the fastening assembly according to a first embodiment of the present invention.
Figure 2:
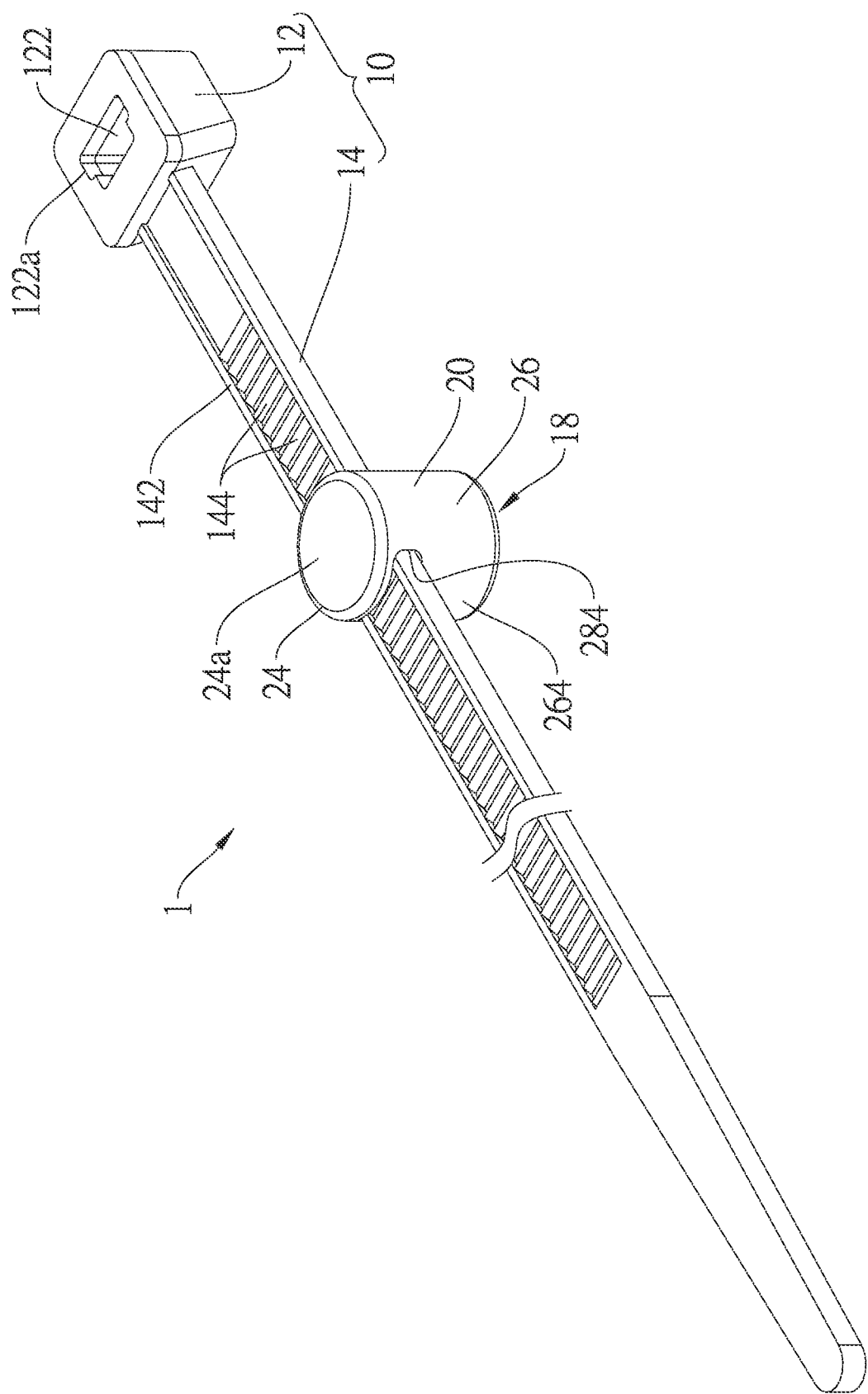
FIG. 2 is a perspective view of the fastening assembly seen from another direction according to the first embodiment of the present invention.
Figure 3:
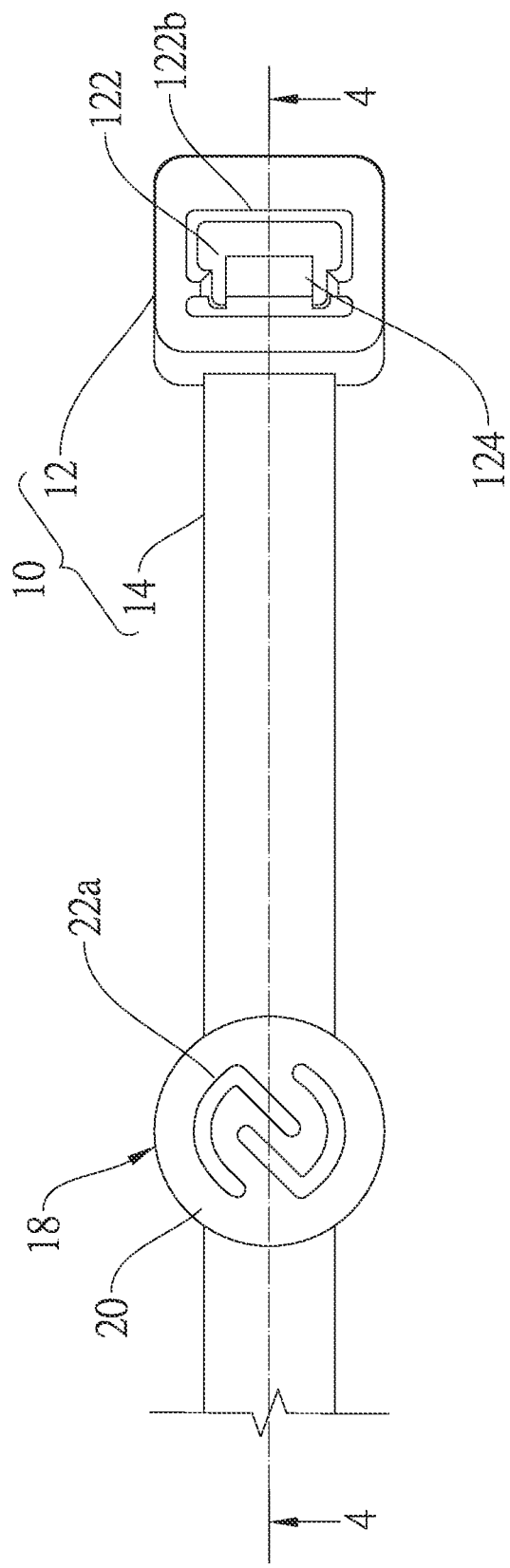
FIG. 3 is a top view of the fastening assembly according to the first embodiment of the present invention.
Figure 4:
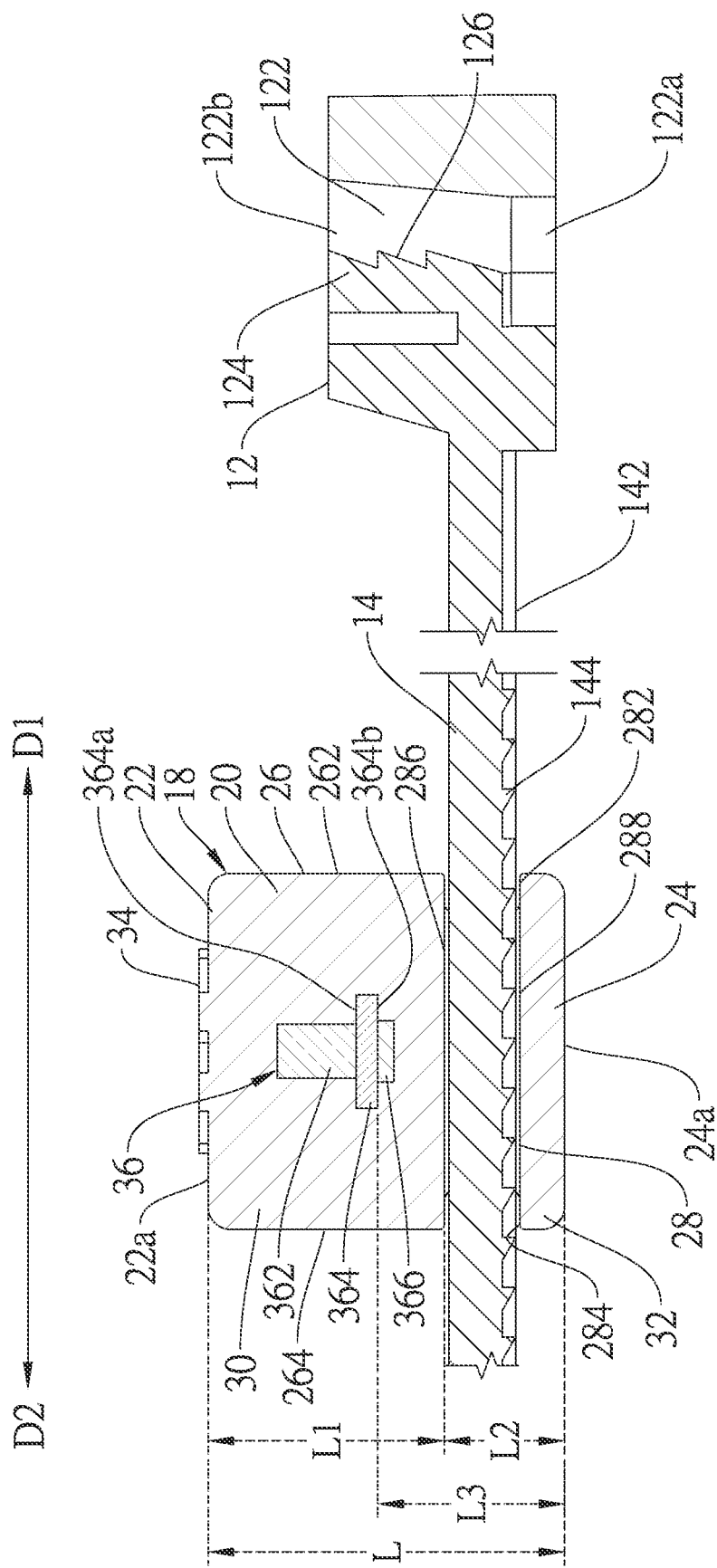
FIG. 4 is a sectional view along the 4-4 line in FIG. 3.
Figure 5:
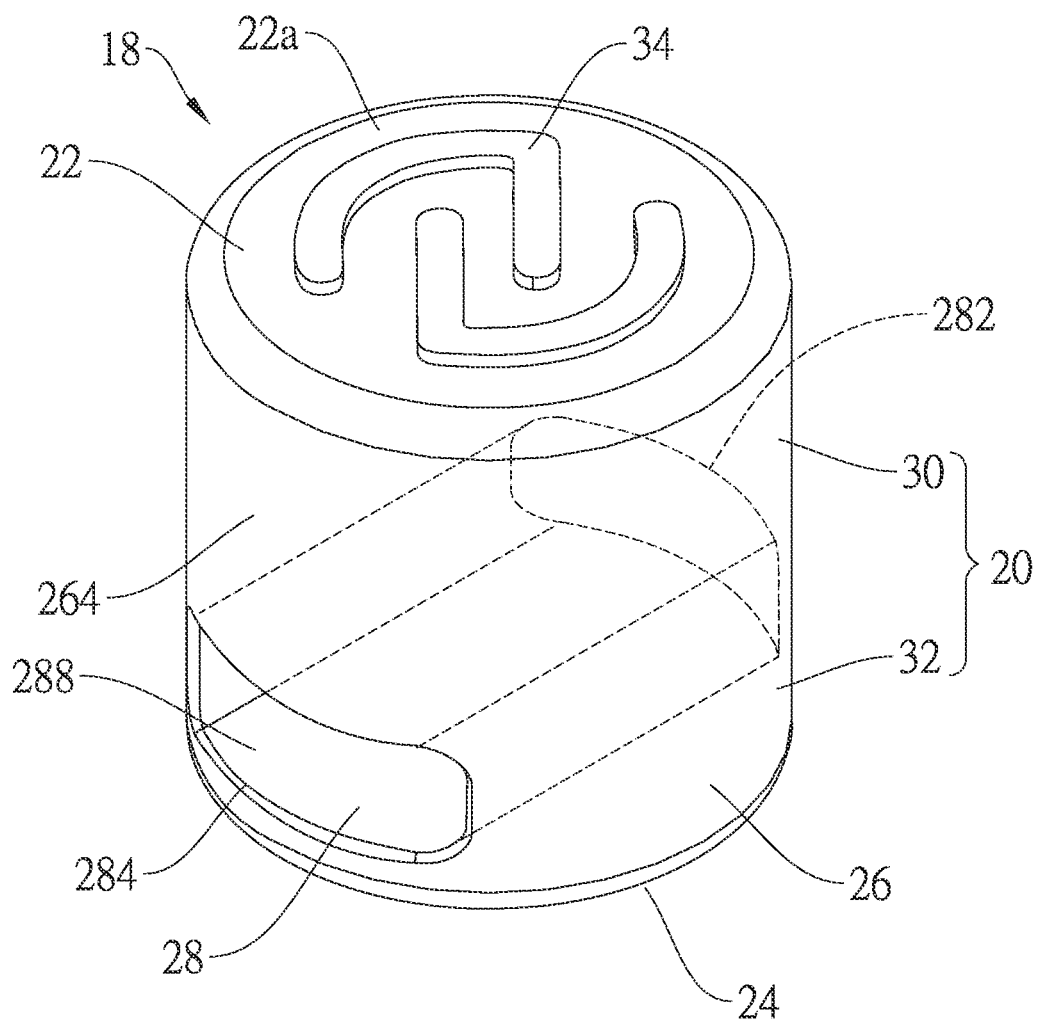
FIG. 5 is a perspective view of the RFID tag according to the first embodiment of the present invention.

A fastening assembly 1 according to a first embodiment according of the present invention is shown in FIG. 1 to FIG. 6 and includes a tie 10 and an RFID tag 18.

The tie 10 includes a head member 12 and a strap member 14, wherein the head member 12 and the strap member 14 are integrally molded as a monolithic unit from a plastic material. The head member 12 has a lock hole 122, wherein an inside of the lock hole 122 is provided with at least one pawl 126. In the current embodiment, the at least one pawl 126 includes a plurality of pawls 126. More specifically, the lock hole 122 has an insertion end 122a and an exit end 122b. The lock hole 122 has two hole walls facing each other, wherein one of the hole walls of the lock hole 122 is connected to an elastic tongue 124. A free end of the tongue 124 extends towards the exit end 122b. The tongue 124 has the plurality of pawls 126.

The strap member 14 is elongated, wherein an end of the strap member 14 is connected to the head member 12. The strap member 14 has a surface 142. A plurality of engaging teeth 144 is provided on the surface 142 and is arranged along a longitudinal direction of the strap member 14. Another end of the strap member 14 could pass through the lock hole 122 from the insertion end 122a of the lock hole 122 in a one-way direction, so that the plurality of pawls 126 abut against one of the plurality of engaging teeth 144 and a portion of the strap member 14 forms a closed loop 16. The pawls 126 and the engaging teeth 144 abutted against the pawls 126 prevent the strap member 14 from being pulled out of the insertion end 122a.

The RFID tag 18 includes a body 20 and an RFID device 36. In the current embodiment, the body 20 is a cylinder as an example, but it is not limited thereto; the body 20 could also be a polygonal prism. A material of the body 20 is non-metallic, such as plastic or rubber. The body 20 has a first end 22, a second end 24 opposite to the first end 22, and a perimeter wall 26 connected between the first end 22 and the second end 24. The perimeter wall 26 has a first side 262 and a second side 264 opposite to the first side 262 in a radial direction of the body 20. The body 20 has a through hole 28 penetrating through the first side 262 and the second side 264 in the radial direction of the body 20. The through hole 28 forms a first opening 282 on the first side 262 and a second opening 284 on the second side 264.

In the current embodiment, an end face 22a of the first end 22 is optionally provided with a texture 34. The body 20 has a first section 30 and a second section 32 connected to each other between the first end 22 and the second end 24 (that is, in an axial direction of the body 20). The through hole 28 is located at the second section 32. In the axial direction of the body 20, the through hole 28 has a first hole wall 286 and a second hole wall 288 that face each other. The second hole wall 288 is located between the first hole wall 286 and the second end 24. The first section 30 is formed between the first hole wall 286 and the end face 22a of the first end 22 while the second section 32 is formed between the first hole wall 286 and an end face 24a of the second end 24. In the axial direction of the body 20, the first section 30 has a first length L1 while the second section 32 has a second length L2. The first length L1 is greater than the second length L2; in other words, the through hole 28 is closer to the second end 24 relative to the first end 22. In an embodiment, the first length L1 could be equal to or be substantially equal to the second length L2.

In the axial direction of the body 20, a length L is provided between the end face 22a of the first end 22 and the end face 24a of the second end 24. The length L is equal to the sum of the first length L1 and the second length L2. The length L could, for example, be 5 mm to 10 mm.

The another end of the strap member 14 could pass through the through hole 28 from the first opening 282 in an insertion direction, such that the body 20 is movable in a first direction D1 and a second direction D2 (the insertion direction) opposite to the first direction D1 along the longitudinal direction of the strap member 14 to change a position of the body 20 along the longitudinal direction of the strap member 14. The first direction D1 is orientated towards the head member 12. In the current embodiment, the another end of the strap member 14 could also pass through the through hole 28 from the second opening 284 in the insertion direction (the second direction D2).

The RFID device 36 is embedded in the body 20. More specifically, the RFID device 36 is embedded in the first section 30 of the body 20. In the current embodiment, the RFID device 36 records identification data and is configured for a reader (not shown) to read the identification data. The RFID device 36 includes an antenna coil 362, a circuit board 364, and a chip 366. The antenna coil 362 is located between the circuit board 364 and the first end 22. The antenna coil 362 and the chip 366 are respectively disposed on two opposite surfaces 364a, 364b of the circuit board 364. The surface 364a of the circuit board 364 faces the first end 22 while the surface 364b of the circuit board 364 faces the second end 24. The chip 366 records the identification data. In an embodiment, the RFID device 36 could also use NFC (Near-Field Communication).

In the axial direction of the body 20, a distance L3 is provided between the surface 364b of the circuit board 364, which is provided with the chip 366, and the end face 24a of the second end 24. The distance L3 is greater than or equal to 0.45 times the length L. In the current embodiment, the distance L3 is between 0.45 times and 0.7 times the length L. Preferably, the distance L3 is between 0.5 times and 0.65 times the length L, and more preferably, the distance L3 is between 0.55 times and 0.6 times the length L. In this way, when the RFID tag 18 is fastened to an object 100, the RFID device 36 is prevented from the interference of the object 100 due to being too close to the object 100, especially the objects with metal materials.

With the above-mentioned structure, after the strap member 14 passes through the through hole 28 of the body 20, the RFID tag 18 is movable in the first direction D1 and the second direction D2 along the longitudinal direction of the strap member 14.

Figure 6:
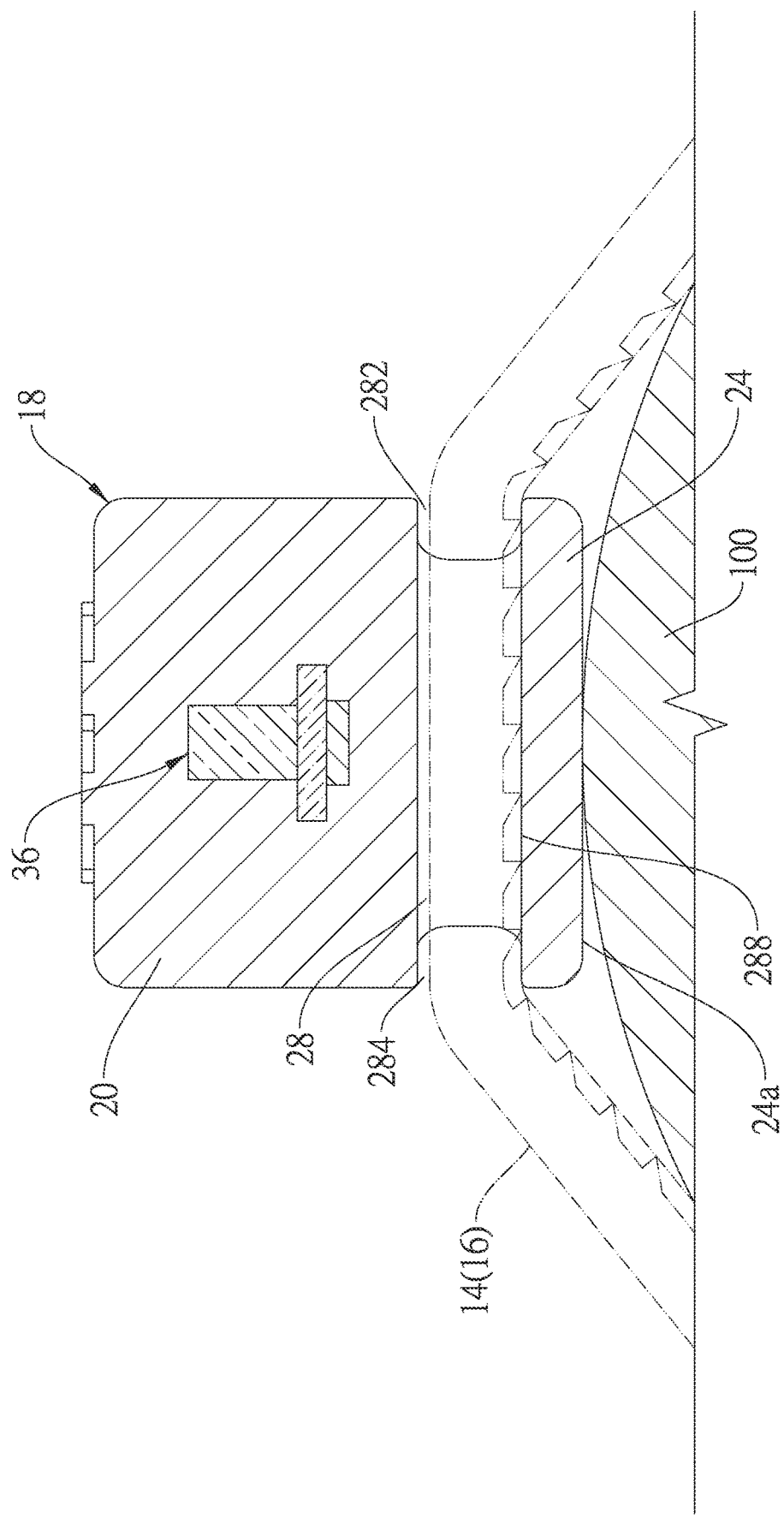
FIG. 6 is a schematic view showing that the fastening assembly is fastened around the object.
Figure 7:
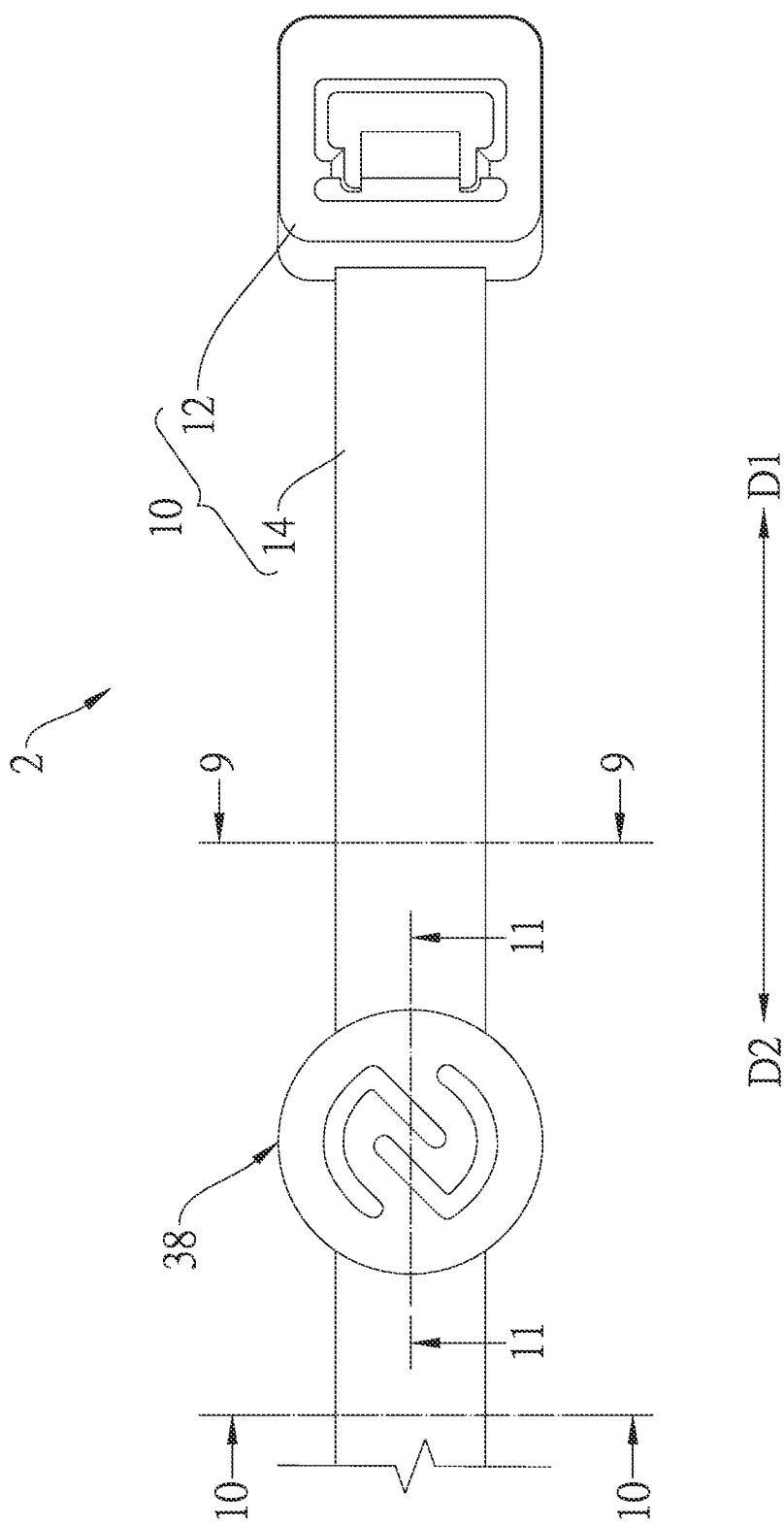
FIG. 7 is a top view of the fastening assembly according to a second embodiment of the present invention.
Figure 8:
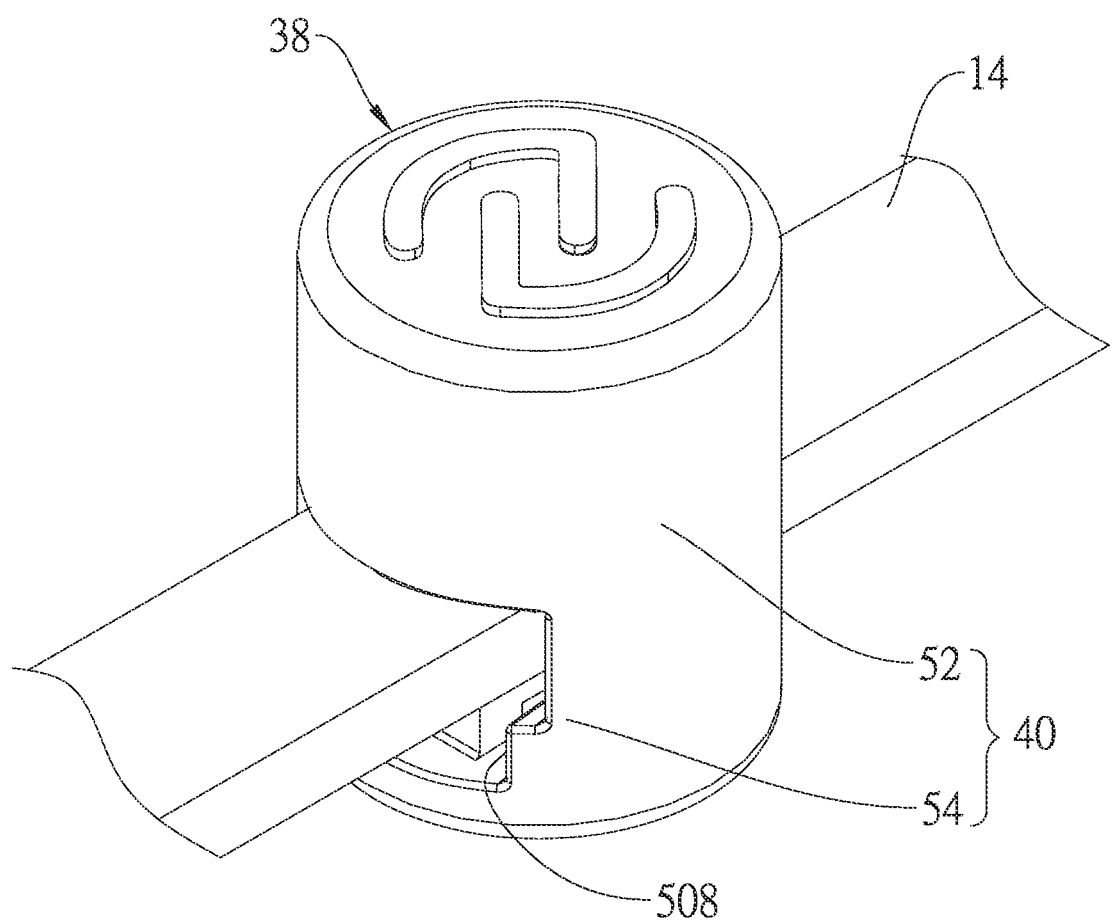
FIG. 8 is a partial perspective view of the fastening assembly according to the second embodiment of the present invention.
Figure 9:
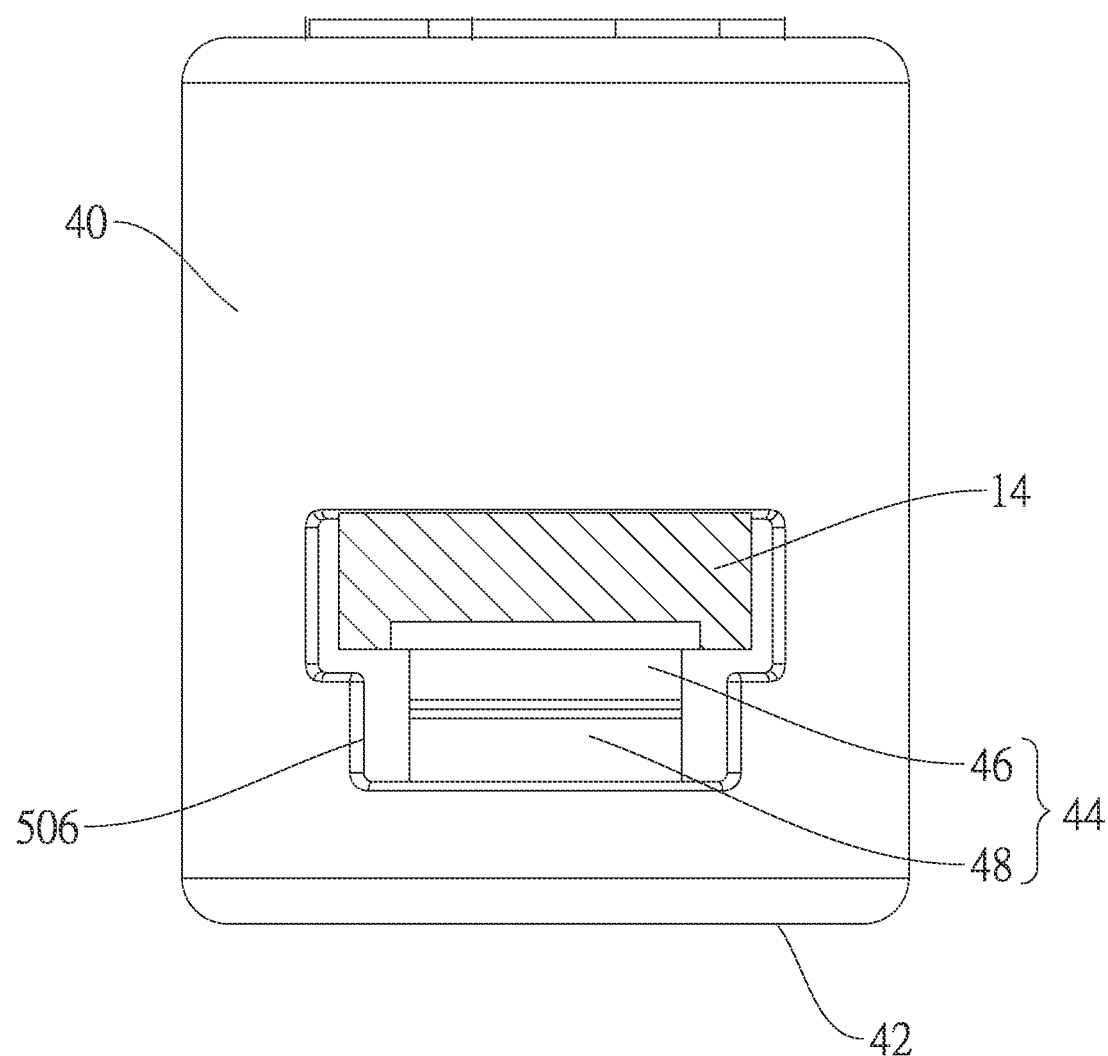
FIG. 9 is a sectional view along the 9-9 line in FIG. 7.
Figure 10:
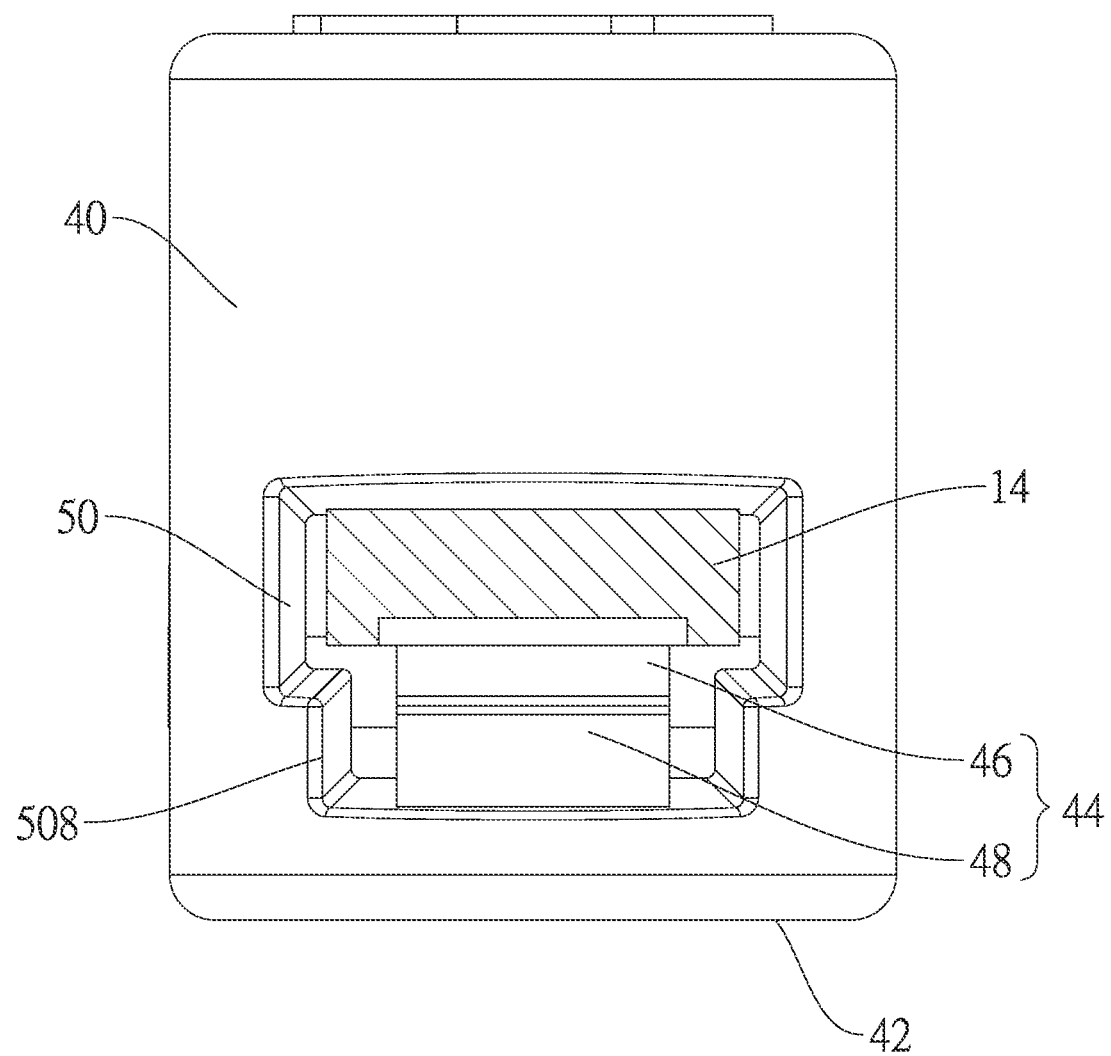
FIG. 10 is a sectional view along the 10-10 line in FIG. 7.

As shown in FIG. 6, after the strap member 14 is wound around the object 100, such as a tube or a wire harness, the strap member 14 is inserted into the head member 12 to be fastened to form the closed loop 16, and the body 20 of the RFID tag 18 is located on the closed loop 16. In the process of tightening the strap member 14, the RFID tag 18 could be adjusted to a suitable position without being limited by a position of the head member 12. After tightening the strap member 14, the strap member 14 urges the second hole wall 288 of the through hole 28, such that the second end 24 of the body 20 abuts against the object 100, thereby achieving the purpose of fastening the RFID tag 18. In this way, the RFID tag 18 could be easily located at a predetermined position suitable for reader sensing.

A fastening assembly 2 according to a second embodiment of the present invention is shown in FIG. 7 to FIG. 14, and is similar to the structure of the first embodiment, except that the body 40 in the second embodiment further includes a block structure 44 which is integrally formed inside the through hole 50. The block structure 44 is configured to abut against the strap member 14 to prevent the body 40 from sliding relative to the strap member 14.

In the current embodiment, a space S1 is formed between two adjacent engaging teeth 144 of the plurality of engaging teeth 144 of the strap member 14. The block structure 44 includes an elastic piece 46 protruding into the space S1 between the two adjacent engaging teeth 144 located in the through hole 50 to position the body 40 in the longitudinal direction of the strap member 14. More specifically, the block structure 44 includes a base 48 integrally connected to the second hole wall 504. The base 48 has a surface 482 facing the first hole wall 502. The elastic piece 46 is located on the surface 482 of the base 48 and protrudes towards the first hole wall 502. The elastic piece 46 has a lateral direction and a longitudinal direction, wherein the lateral direction is parallel to an extending direction of the through hole 50 while the longitudinal direction is perpendicular to an extending direction of the through hole 50. The strap member 14 passes between the surface 482 of the base 48 and the first hole wall 502.

In the axial direction of the body 40, the through hole 50 has a first slot section 50*a*, and a second slot section 50*b*, wherein the second slot section 50*b* is located between the first slot section 50*a* and the second end 42. The through hole 50 is constituted by the first slot section 50*a* and the second slot section 50*b*, wherein the first slot section 50*a* has the first hole wall 502 while the second slot section 50*b* has the second hole wall 504. At any position in the extending direction of the through hole 50, a slot width W1 of the first slot section 50*a* in the longitudinal direction of the elastic piece 46 is greater than a slot width W2 of the second slot section 50*b* in the longitudinal direction of the elastic piece 46. The base 48 is located at the second slot section 50*b*, the elastic piece 46 protrudes into the first slot section 50*a*, and the strap member 14 passes through the first slot section 50*a*.

In the current embodiment, the slot width W1 of the first slot section 50*a* and the slot width W2 of the second slot section 50*b* increase gradually from the first opening 506 to the second opening 508 in the extending direction of the through hole 50. A distance between the first hole wall 502 and the second hole wall 504 in the axial direction of the body 40, which is the height of the through hole 50, increases gradually from the first opening 506 to the second opening 508. In the current embodiment, the first length L1 of the first section 52 of the body 40 is slightly greater than the second length L2 of the second section 54. In other embodiments, the first length L1 could be equal to or substantially equal to the second length L2. In an embodiment, in the extending direction of the through hole 50, the slot width W1 of the first slot section 50*a* could be a constant; the slot width W2 of the second slot section 50*b* in could be a constant; a height of the through hole 50 could also be a constant.

Figure 11:
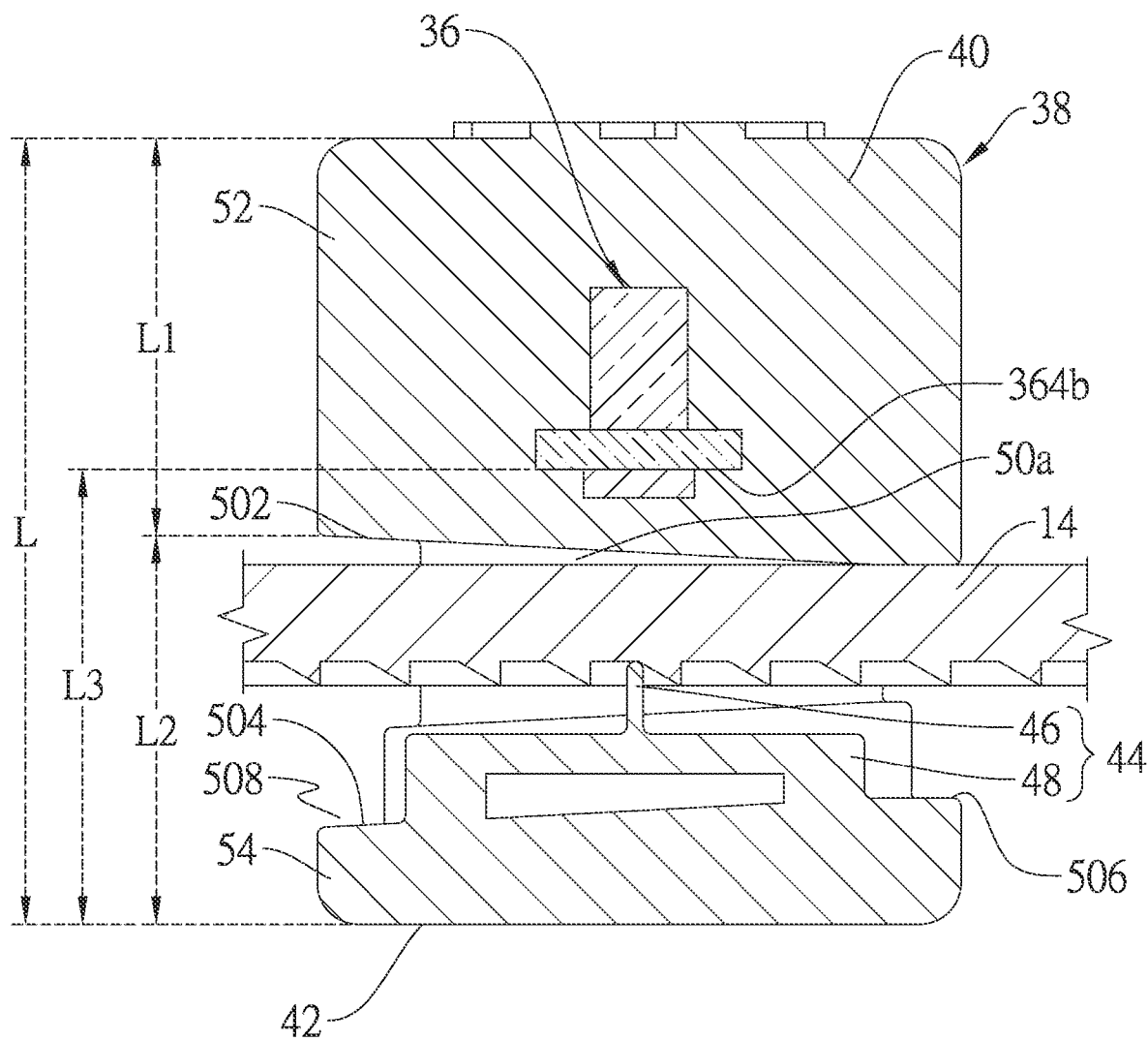
FIG. 11 is a sectional view along the 11-11 line in FIG. 7.
Figure 12:
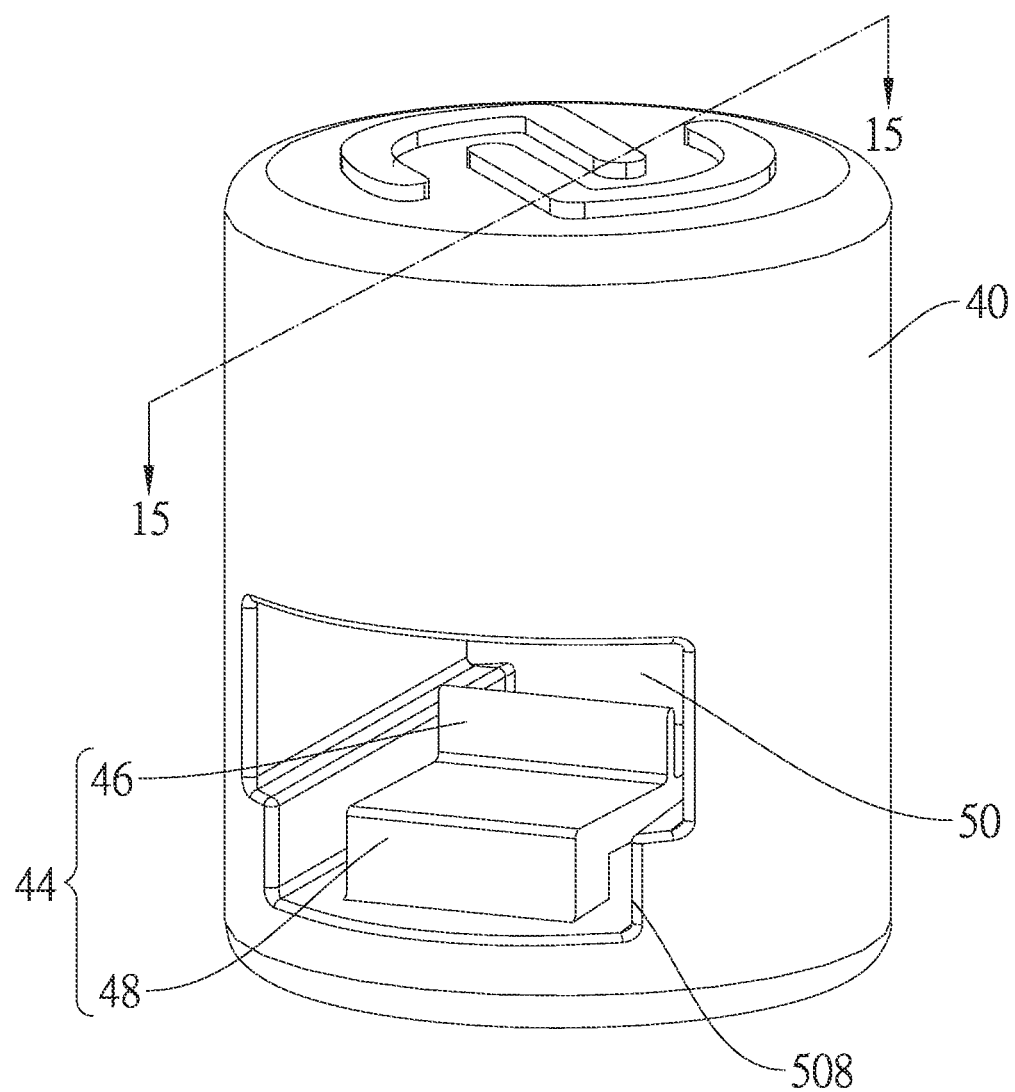
FIG. 12 is a perspective view of the RFID tag according to the second embodiment of the present invention.
Figure 13:
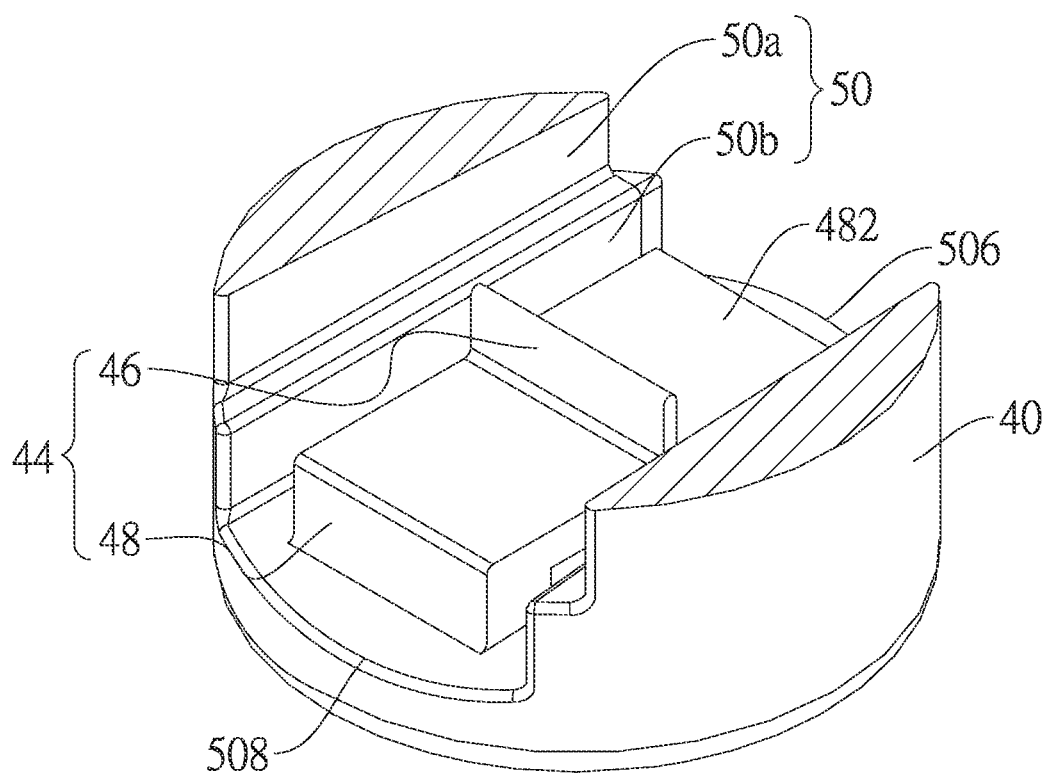
FIG. 13 is a schematic view, showing a section of a part of the RFID tag according to the second embodiment of the present invention.
Figure 14:
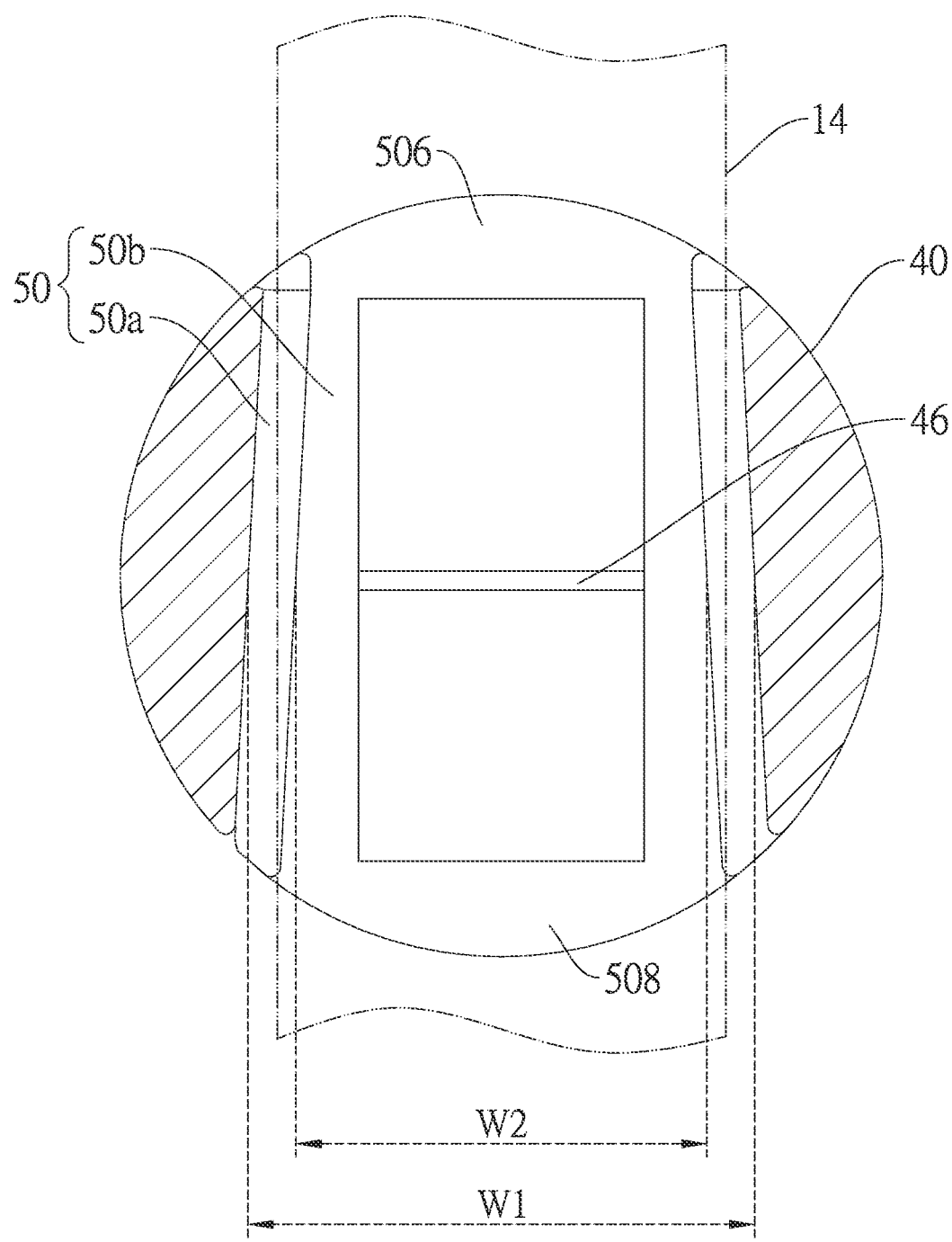
FIG. 14 is a top view of FIG. 13.
Figure 15:
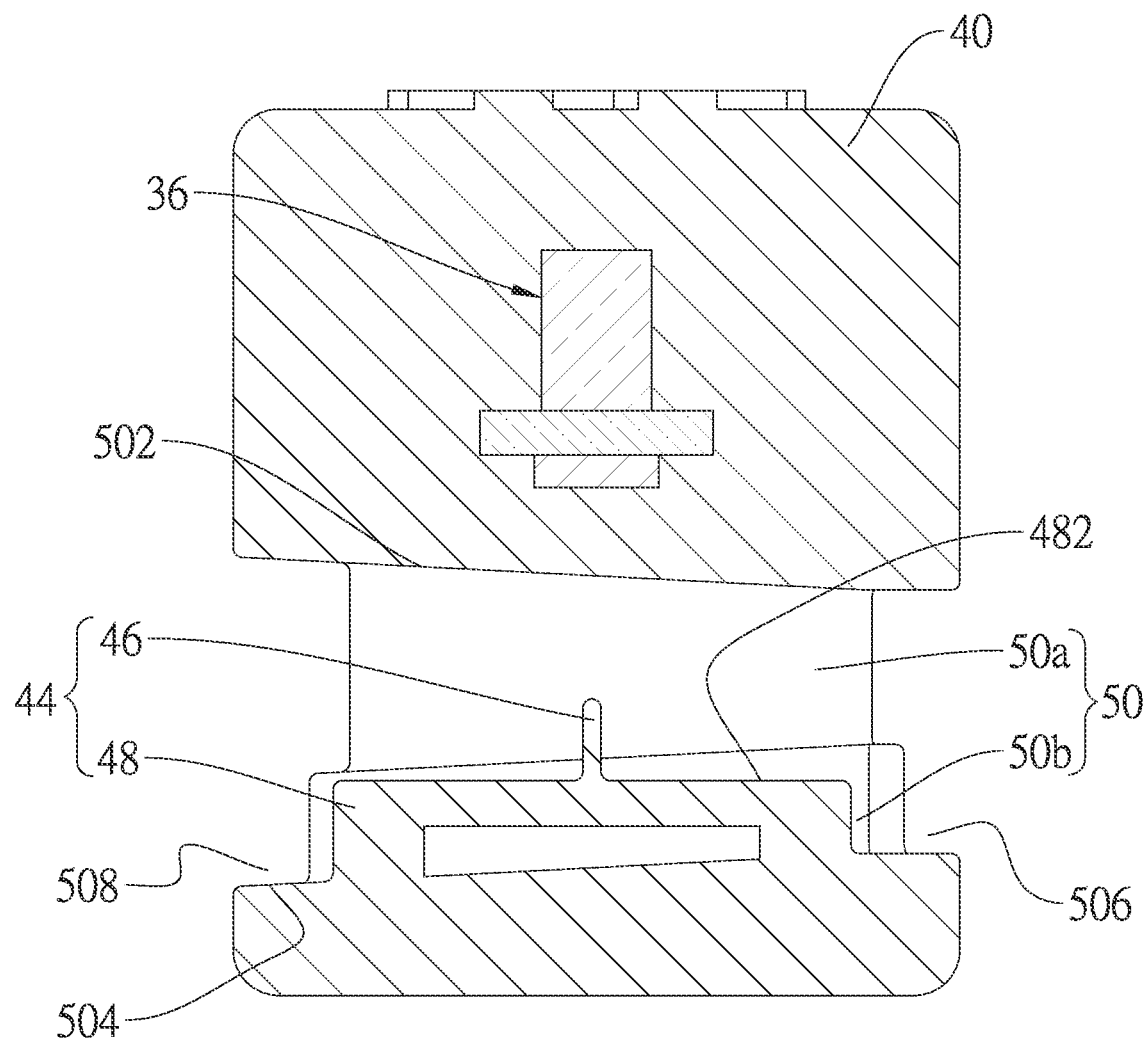
FIG. 15 is a sectional view along the 15-15 line in FIG. 12.

As shown in FIG. 11, when the body 40 and the strap member 14 are not relatively moved, the elastic piece 46 is confined within the space S1 between the two adjacent engaging teeth 144 to prevent the body 40 from sliding relative to the strap member 14.

Figure 16:
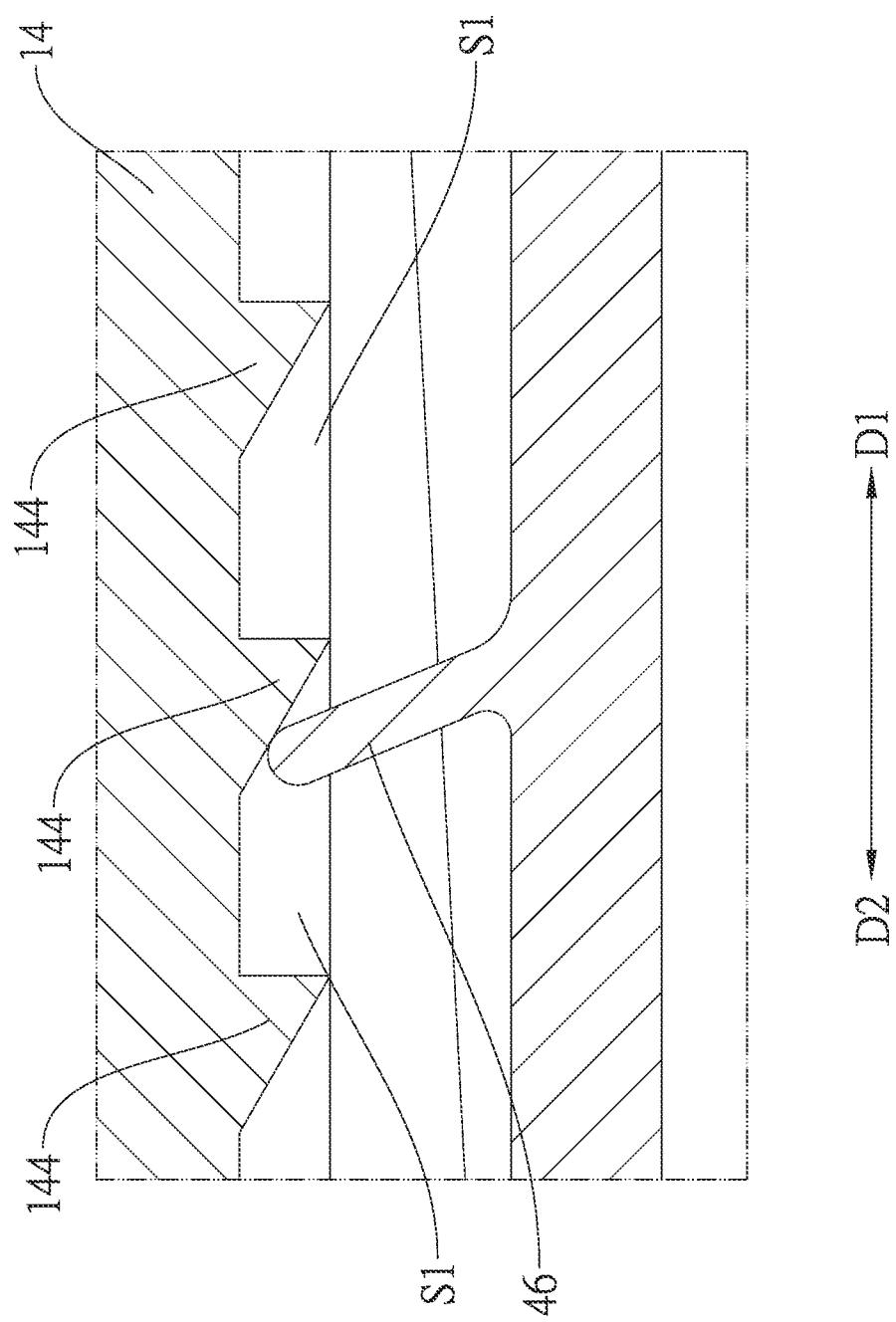
FIG. 16 is a schematic view showing that when the body moves along the first direction, the engaging tooth pushes against the elastic piece.
Figure 17:
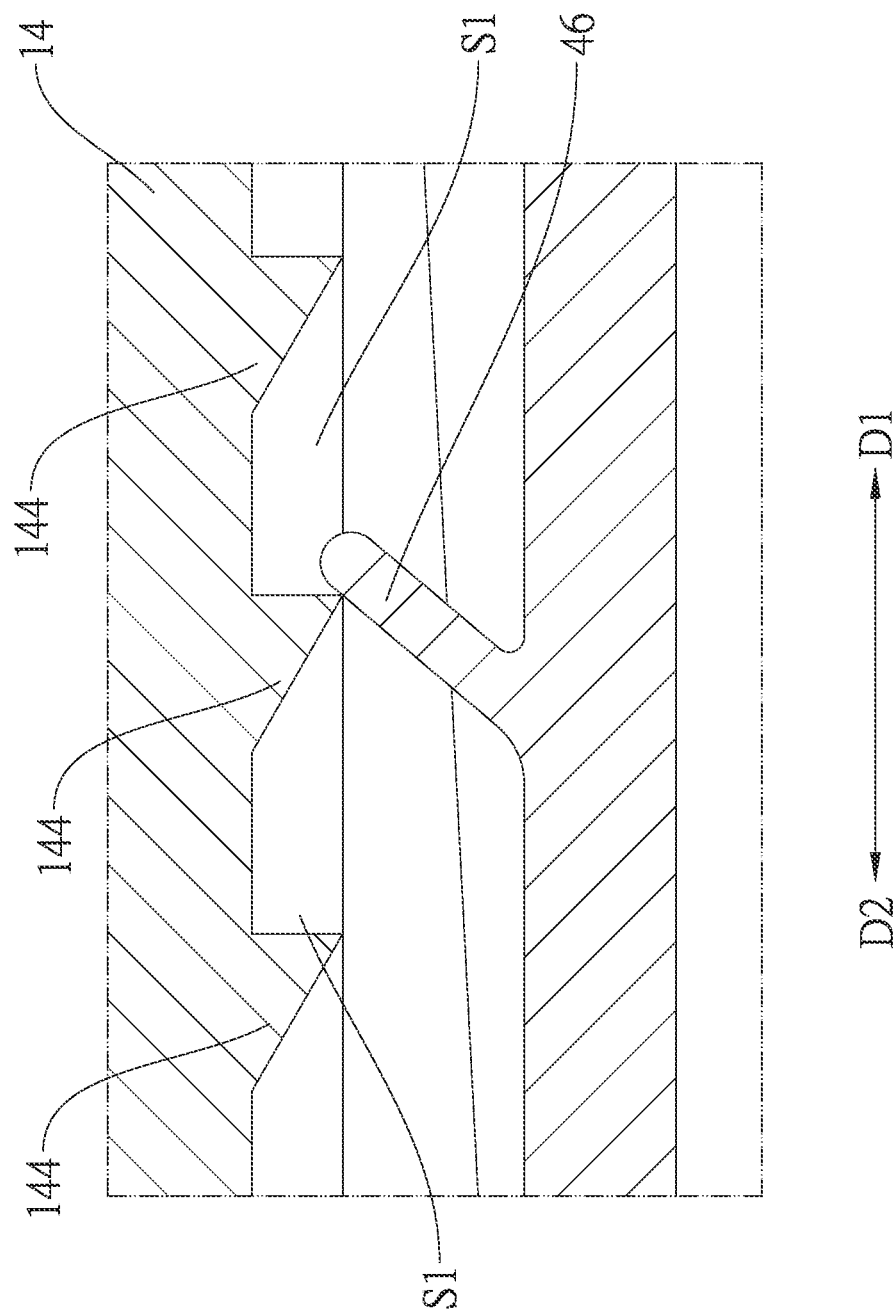
FIG. 17 is a schematic view showing that when the body moves along the second direction, the engaging tooth pushes against the elastic piece.
Figure 18:
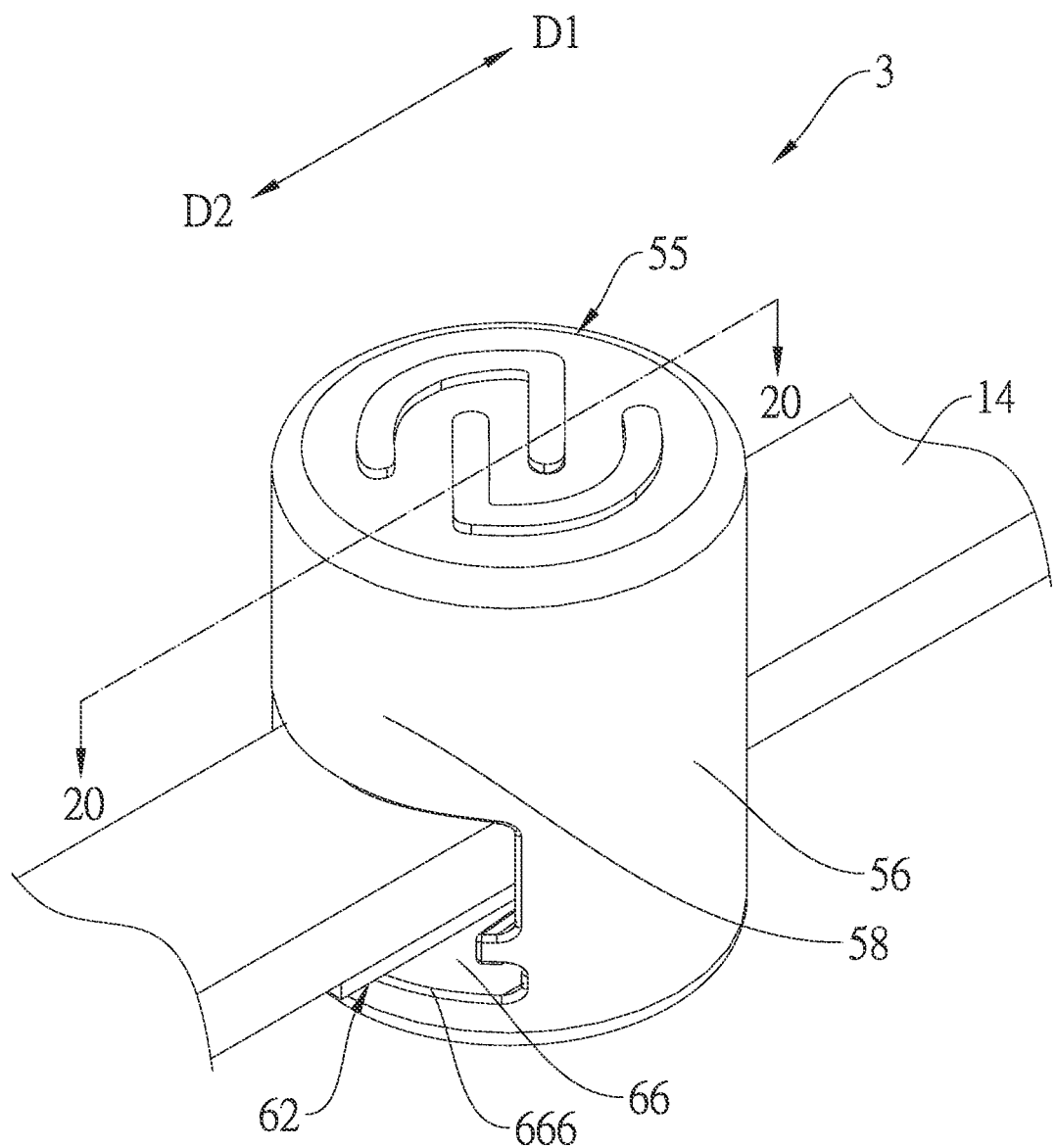
FIG. 18 is a partial perspective view of the fastening assembly according to a third embodiment of the present invention.
Figure 19:
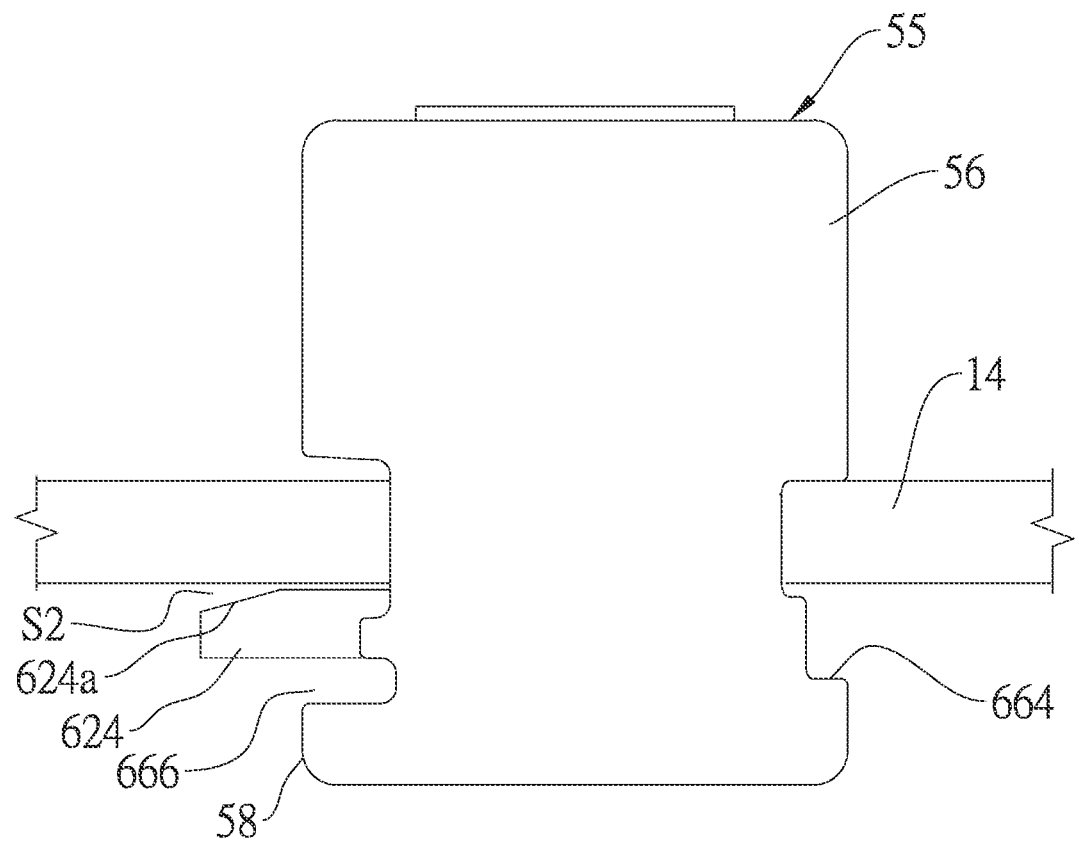
FIG. 19 is a partial side view of the fastening assembly according to the third embodiment of the present invention.

The body 40 and the strap member 14 could be relatively moved by pushing the body 40 or pulling the strap member 14. As shown in FIG. 16, when the body 40 is pushed in the first direction D1 or the strap member 14 is pulled in the second direction D2, the elastic piece 46 is pushed by one of the engaging teeth 144 that is corresponding to elastically deform in the second direction D2, and the elastic piece 46 returns to an original state when the elastic piece 46 enters another space S1. When the body 40 is continuously pushed in the first direction D1 or the strap member 14 is continuously pulled in the second direction D2, the engaging teeth 144 pass through the elastic piece 46 in sequence, so that the body 40 and the strap member 14 could be continuously moved relative to each other. In contrast, as shown in FIG. 17, when the body 40 is pushed in the second direction D2 or the strap member 14 is pulled in the first direction D1, the elastic piece 46 is pushed by the corresponding engaging tooth 144 to elastically deform in the first direction D1, and the elastic piece 46 could enter another adjacent space S1. When the body 40 is continuously pushed in the second direction D2 or the strap member 14 is continuously pulled the first direction D1, the body 40 and the strap member 14 could be continuously moved relative to each other.

In this way, under exerting an external force, the body 40 are movable on the strap member 14, thereby achieving the purpose of adjusting the position of the RFID tag 38 on the strap member 14 of the tie 10.

Figure 22:
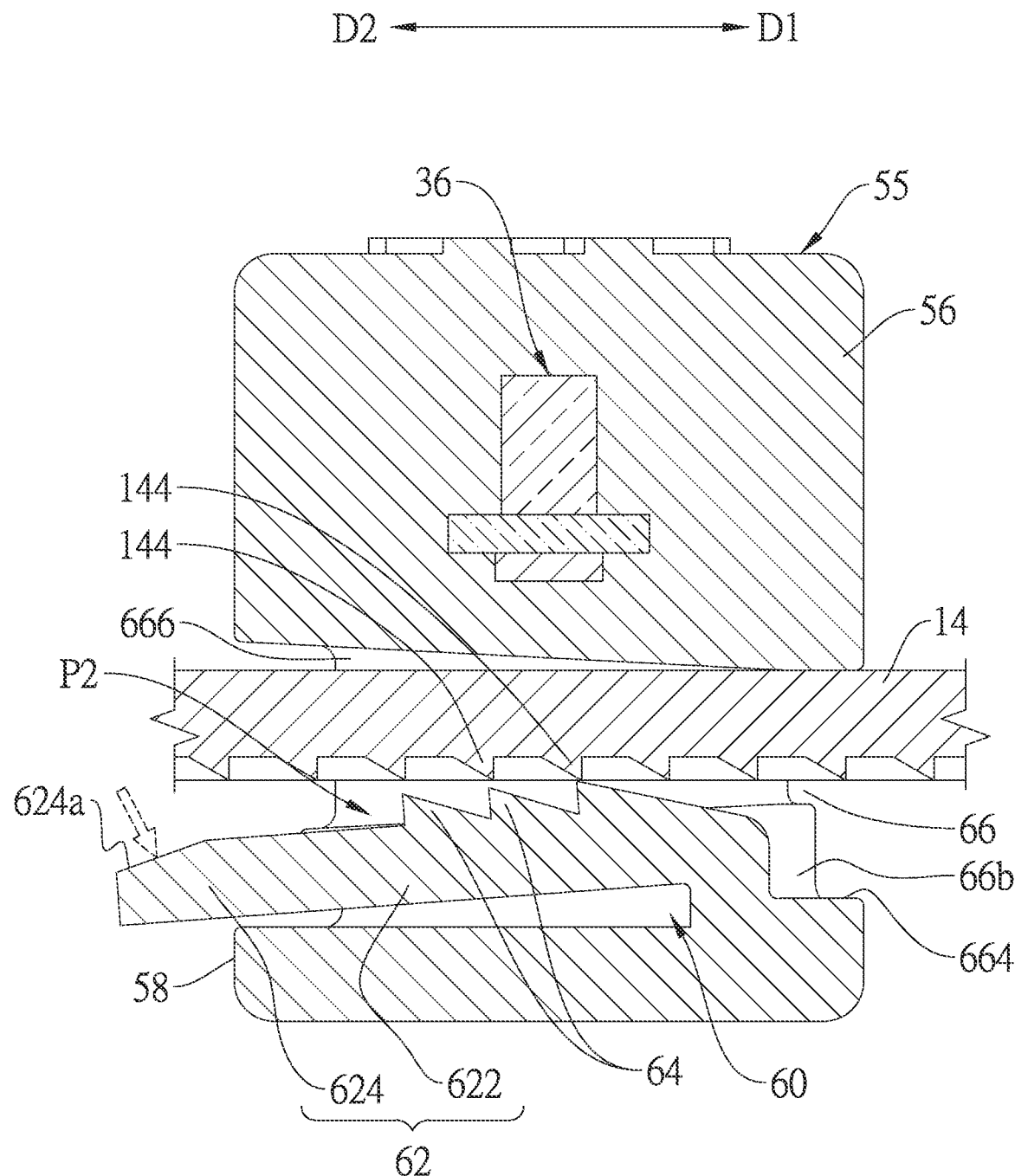
FIG. 22 is a schematic view showing that the elastic plate is pressed downwards.

A fastening assembly 3 according to a third embodiment of the present invention is shown in FIG. 18 to FIG. 22 and has a structure similar to the fastening the fastening assembly 2 of the second embodiment, except that the block structure 60 of the third embodiment are movable between a first position P1 (shown in FIG. 20) and a second position P2 (shown in FIG. 22). When the block structure 60 is located at the first position P1, the block structure 60 abuts against at least one of the plurality of engaging teeth 144 of the strap member 14 located in the through hole 66 to restrict the body 56 to moving only along the first direction D1. When the block structure 60 is located at the second position P2, the block structure 60 is detached from the plurality of engaging teeth 144, so that the body 56 is movable along the first direction D1 and the second direction D2.

More specifically, the block structure 60 has an elastic plate 62 and at least one further pawl 64. The elastic plate 62 has a first plate section 622 and a second plate section 624. The first plate section 622 is located in the through hole 66, wherein an end of the first plate section 622 is connected to the second hole wall 662. The at least one further pawl 64 is located on the first plate section 622. In the current embodiment, the at least one further pawl 64 includes a plurality of further pawls 64. Each of the further pawls 64 has a block face 642 and an inclined face 644, wherein the block face 642 of each of the further pawls 64 faces the second opening 666 and the inclined face 644 of each of the further pawls 64 inclines from the block face 642 of each of the further pawls 64 towards the first opening 664. The second plate section 624 extends out of the through hole 66 from the second opening 666. Preferably, the second plate section 624 has a tapered face 624*a* facing away from the second hole wall 662 and facing the strap member 14; a space S2 is formed between the tapered face 624*a* and the strap member 14 to facilitate pressing the second plate section 624.

At least a portion of the first plate section 622 of the elastic plate 62 is located at the second slot section 66*b*. The plurality of further pawls 64 protrude into the first slot section 66a. Each of the engaging teeth 144 of the strap member 14 has a block face 144a and an inclined face 144b. An orientation of the block face 144a of each of the engaging teeth 144 is opposite to an orientation of the block face 642 of each of the further pawls 64.

Figure 20:
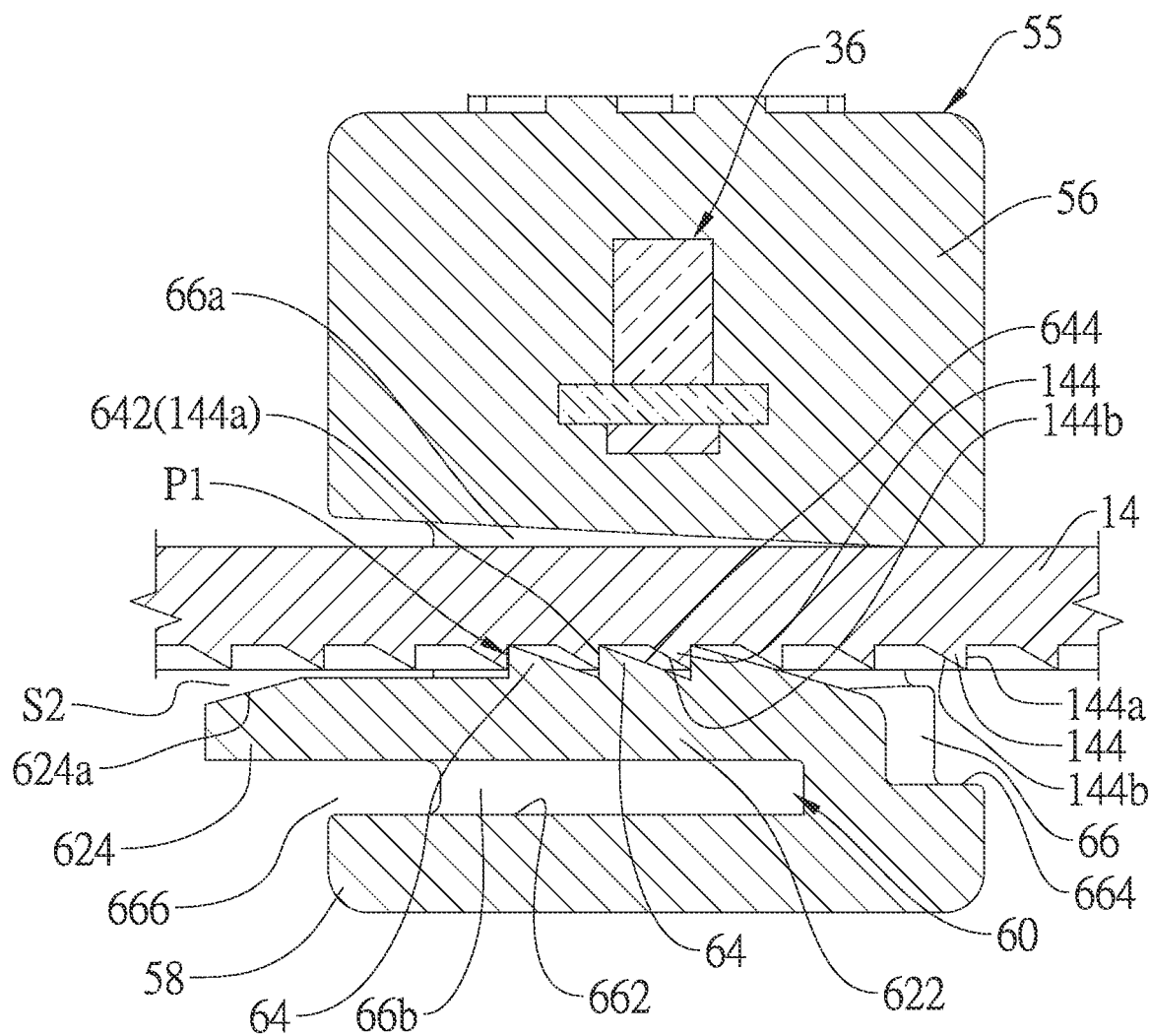
FIG. 20 is a sectional view along the 20-20 line in FIG. 18.
Figure 21:
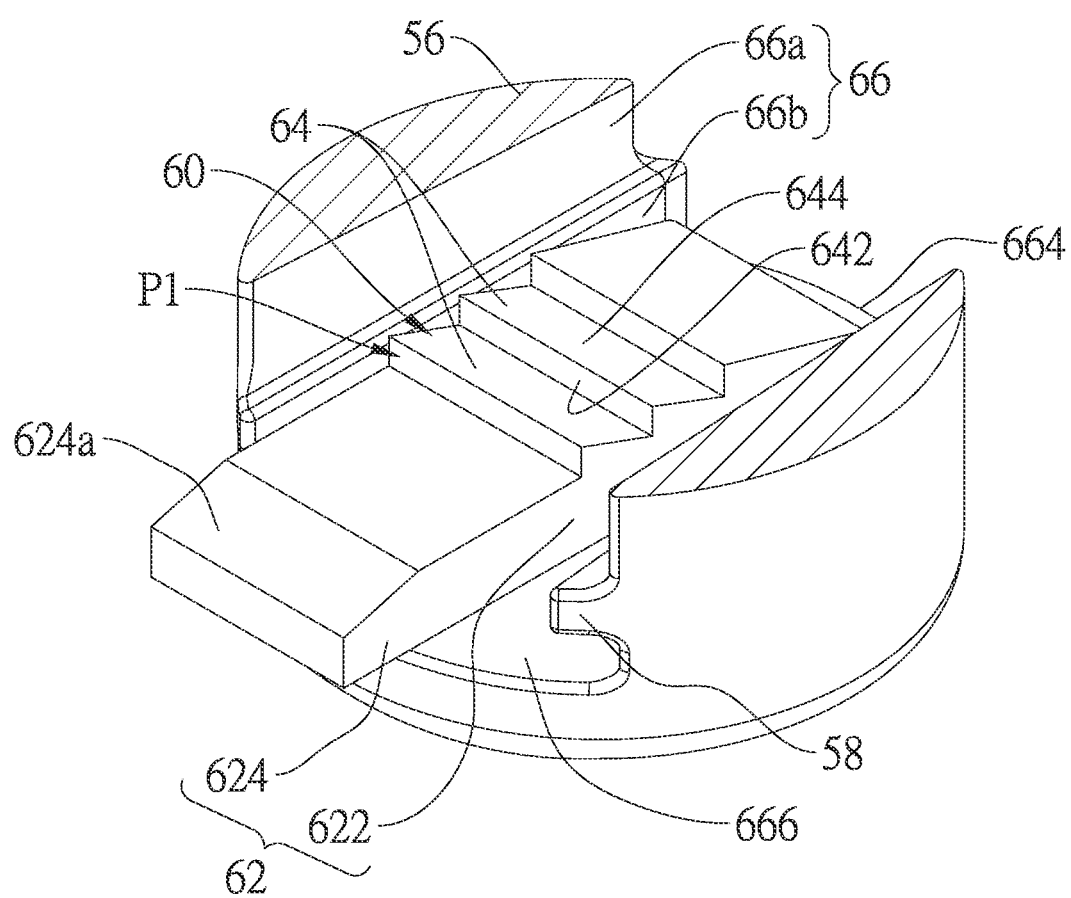
FIG. 21 is a schematic view, showing a section of a part of the RFID tag according to the third embodiment of the present invention.

As shown in FIG. 20, when is the further pawls 64 are located at the first position P1, the further pawls 64 abut against the engaging teeth 144 of the strap member 14 passing through the first slot section 66a, and the block face 642 of each of the further pawls 64 and the block face 144a of each of the engaging teeth 144 face each other. At this moment, the body 56 could only be pushed along the first direction D1 or the strap member 14 could only be pulled along the second direction D2; the inclined face 144b of one of the engaging teeth 144 located in the first slot section 66a pushes the inclined face 644a of one of the further pawls 64 that is corresponding, such that the engaging teeth 144 sequentially pass the further pawls 64 in a one-way direction; when the strap member 14 is pulled along the first direction D1, the block face 642 of each of the further pawls 64 abuts against the block face 144a of one of the engaging teeth 144 to prevent the body 56 from moving relative to the strap member 14.

As shown in FIG. 22, the second plate section 624 is pressed downward by an external force applied from an outside of the second side 58 of the body 56. Preferably, the external force is applied on the tapered face 624a. Thus, the elastic plate 62 could be driven to move towards the second hole wall 662, such that the further pawls 64 are driven to move from the first position P1 to the second position P2, thereby detaching the further pawls 64 of the block structure 60 from the corresponding engaging teeth 144. In this way, the body 56 slidable relative to the strap member 14 along the first direction D1 and the second direction D2. Under the external force, the body 56 are movable on the strap member 14, thereby achieving the purpose of adjusting the position of the RFID tag 55 on the strap member 14.

With the aforementioned design, with the fastening assembly and the RFID tag in the present invention, the RFID tag could move back and forth along the strap member of the tie, thereby facilitating the adjustment of the position of the RFID tag.

It must be pointed out that the embodiments described above are only some embodiments of the present invention. All equivalent structures which employ the concepts disclosed in this specification and the appended claims should fall within the scope of the present invention.

What is claimed is:

1. A fastening assembly, comprising:
   a tie having a head member and a strap member, wherein the head member has a lock hole; an inside of the lock hole is provided with at least one pawl; the strap member is elongated, wherein an end of the strap member is connected to the head member; the strap member has a surface; a plurality of engaging teeth is provided on the surface of the strap member and is arranged along a longitudinal direction of the strap member; and
   an RFID tag comprising an RFID device and a body, wherein the RFID device is embedded in the body; the body has a perimeter wall having a first side and a second side opposite to the first side; the body has a through hole penetrating through the first side and the second side; another end of the strap member passes through the through hole; the body is movable in a first direction and a second direction opposite to the first direction along the longitudinal direction of the strap member to change a position of the body along the longitudinal direction of the strap member;
   wherein the another end of the strap member is configured to pass through the lock hole, so that the at least one pawl abuts against one of the plurality of engaging teeth and a portion of the strap member forms a closed loop; the body of the RFID tag is located on the closed loop;
   wherein the body of the RFID tag has a first end and a second end opposite to the first end; the perimeter wall is connected between the first end and the second end; the body has a first section and a second section connected to each other between the first end and the second end; the RFID device is embedded in the first section; the through hole is located at the second section.

2. The fastening assembly as claimed in claim 1, wherein the through hole has a first hole wall and a second hole wall that face each other; the second hole wall is located between the first hole wall and the second end; the first section is formed between the first hole wall and the first end while the second section is formed between the first hole wall and the second end; the first section has a first length between the first end and the second end while the second section has a second length between the first end and the second end; the first length is greater than or equal to the second length.

3. The fastening assembly as claimed in claim 1, wherein a space is formed between two adjacent engaging teeth of the plurality of engaging teeth of the strap member; an inside of the through hole is provided with an elastic piece protruding into the space of the two adjacent engaging teeth of the plurality of engaging teeth located in the through hole to position the body in the longitudinal direction of the strap member; when the body moves relative to the strap member, the elastic piece is pushed by one of the plurality of engaging teeth that is corresponding to elastically deform; when the elastic piece enters another space, the elastic piece returns to an original state.

4. The fastening assembly as claimed in claim 3, wherein the through hole has a first hole wall and a second hole wall that face each other; the second hole wall is located between the first hole wall and the second end; the second hole wall is provided with a base having a surface, wherein the surface of the base faces the first hole wall; the elastic piece is located on the surface of the base and protrudes towards the first hole wall.

5. The fastening assembly as claimed in claim 4, wherein the through hole has a first slot section and a second slot section; the second slot section is located between the first slot section and the second end; the first slot section has the first hole wall while the second slot section has the second hole wall; a slot width of the first slot section is greater than a slot width of the second slot section; the base is located at the second slot section; the elastic piece protrudes into the first slot section; the strap member passes through the first slot section of the through hole.

6. The fastening assembly as claimed in claim 1, wherein an inside of the through hole is provided with a block structure which is movable between a first position and a second position; when the block structure is located at the first position, the block structure abuts against at least one of the plurality of engaging teeth of the strap member located in the through hole to restrict the body to moving only along the first direction; when the block structure is located at the second position, the block structure is detached form the plurality of engaging teeth, so that the body is movable along the first direction and the second direction.

7. The fastening assembly as claimed in claim 6, wherein the first direction is orientated towards the head member.

8. The fastening assembly as claimed in claim 6, wherein the through hole has a first hole wall and a second hole wall that face each other; the second hole wall is located between the first hole wall and the second end; the block structure is provided on the second hole wall.

9. The fastening assembly as claimed in claim 8, wherein the block structure has an elastic plate and at least one further pawl; the elastic plate has a first plate section and a second plate section; the first plate section is located in the through hole, wherein an end of the first plate section is connected to the second hole wall; the at least one further pawl is located on the first plate section; the second plate section extends to an outside of the through hole, so that when an external force is exerted to the second plate section from the outside of the through hole, the one further pawl is drive by the second plate to move from the first position to the second position; after the external force is removed, the elastic plate returns to an original state and moves the one further pawl to the first position.

10. The fastening assembly as claimed in claim 9, wherein the second plate section has a tapered face facing away from the second hole wall.

11. The fastening assembly as claimed in claim 9, wherein the through hole has a first slot section and a second slot section; the second slot section is located between the first slot section and the second end; the first slot section has the first hole wall while the second slot section has the second hole wall; a slot width of the first slot section is greater than a slot width of the second slot section; at least a portion of the first plate section of the elastic plate is located at the second slot section; the at least one further pawl protrudes into the first slot section; the strap member passes through the first slot section of the through hole.

12. The fastening assembly as claimed in claim 1, wherein the first end has an end face and the second end has an end face; a length is provided between the end face of the first end and the end face of the second end; the RFID device has a circuit board having a surface which faces the second end; a distance is provided between the surface of the circuit board and the end face of the second end; the distance is greater than or equal to 0.45 times the length.

13. An RFID tag configured to be cooperatively used with a tie, wherein the tie has a strap member having a surface; a plurality of engaging teeth is provided on the surface of the strap member and is arranged along a longitudinal direction of the strap member; the RFID tag is configured to be movable in a first direction and a second direction opposite to the first direction along a longitudinal direction of the strap member; the RFID tag comprises:
a body having a perimeter wall, wherein the perimeter wall has a first side and a second side opposite to the first side; the body has a through hole penetrating through the first side and the second side; the through hole is configured to be passed through by the strap member; the body is movable in the first direction and the second direction along the longitudinal direction of the strap member; and an RFID device embedded in the body;
wherein the body of the RFID tag has a first end and a second end opposite to the first end; the perimeter wall is connected between the first end and the second end; the body has a first section and a second section connected to each other between the first end and the second end; the RFID device is embedded in the first section while the through hole is located at the second section.

14. The RFID tag as claimed in claim 13, wherein the through hole has a first hole wall and a second hole wall that face each other; the second hole wall is located between the first hole wall and the second end; the first section is formed between the first hole wall and the first end while the second section is formed between the first hole wall and the second end; the first section has a first length between the first end and the second end while the second section has a second length between the first end and the second end; the first length is greater than or equal to the second length.

15. The RFID tag as claimed in claim 13, wherein a space is formed between two adjacent engaging teeth of the plurality of engaging teeth of the strap member; an inside of the through hole is provided with an elastic piece configured to protrude into the space of the two adjacent engaging teeth; when the body moves relative to the strap member, the elastic piece is pushed by one of the plurality of engaging teeth that is corresponding to elastically deform; the elastic piece returns to an original state only when the elastic piece enters another space.

16. The RFID tag as claimed in claim 15, wherein the through hole has a first hole wall and a second hole wall that face each other; the second hole wall is located between the first hole wall and the second end; the second hole wall is provided with a base having a surface, wherein the surface of the base faces the first hole wall; the elastic piece is located on the surface of the base and protrudes towards the first hole wall.

17. The RFID tag as claimed in claim 16, wherein the through hole has a first slot section and a second slot section; the second slot section is located between the first slot section and the second end; the first slot section has the first hole wall while the second slot section has the second hole wall; a slot width of the first slot section is greater than a slot width of the second slot section; the base is located at the second slot section; the elastic piece protrudes into the first slot section; the first slot section of the through hole is configured to be passed through by the strap member.

18. The RFID tag as claimed in claim 13, wherein an inside of the through hole is provided with a block structure which is movable between a first position and a second position; when the block structure is located at the first position, the block structure is configured to abut against at least one of the plurality of engaging teeth of the strap member located in the through hole to restrict the body to moving only along the first direction; when the block structure is located at the second position, the block structure is detached from the plurality of engaging teeth, so that the body is movable along the first direction and the second direction.

19. The RFID tag as claimed in claim 18, wherein the through hole has a first hole wall and a second hole wall that face each other; the second hole wall is located between the first hole wall and the second end; the block structure is provided on the second hole wall.

20. The RFID tag as claimed in claim 19, wherein the block structure has an elastic plate and at least one further pawl; the elastic plate has a first plate section and a second plate section; the first plate section is located in the through hole, wherein an end of the first plate section is connected to the second hole wall; the at least one further pawl is located on the first plate section; the second plate section extends to an outside of the through hole, so that when an external force is exerted to the second plate section from the outside of the through hole, the one further pawl is driven to move from the first position to the second position; after the external force is removed, the elastic plate returns to an original state and moves the one further pawl to the first position.

21. The RFID tag as claimed in claim 20, wherein the second plate section has a tapered face facing away from the second hole wall.

22. The RFID tag as claimed in claim 20, wherein the through hole has a first slot section and a second slot section; the second slot section is located between the first slot section and the second end; the first slot section has the first hole wall while the second slot section has the second hole wall; a slot width of the first slot section is greater than a slot width of the second slot section; at least a portion of the first plate section of the elastic plate is located at the second slot section; the at least one further pawl protrudes into the first slot section; the first slot section of the through hole is configured to be passed through by the strap member.

23. The RFID tag as claimed in claim 13, wherein the first end has an end face and the second end has an end face; a length is provided between the end face of the first end and the end face of the second end; the RFID device has a circuit board having a surface which faces the second end; a distance is provided between the surface of the circuit board and the end face of the second end; the distance is greater than or equal to 0.45 times of the length.

\* \* \* \* \*